United States Patent [19]
Mitchell et al.

[11] Patent Number: 5,786,895
[45] Date of Patent: Jul. 28, 1998

[54] MEANS AND METHOD FOR ACTIVE DISPERSION EQUALIZATION OF A MULTIOSCILLATOR RING LASER GYROSCOPE

[75] Inventors: Robert A. Mitchell, Woodland Hills; Tae Whan Hahn, Chatsworth, both of Calif.

[73] Assignee: Litton Systems, Inc., Woodland Hills, Calif.

[21] Appl. No.: 613,335

[22] Filed: Mar. 11, 1996

[51] Int. Cl.⁶ .................................................. G01C 19/66
[52] U.S. Cl. .................................................. 356/350
[58] Field of Search ........................ 356/350; 372/94

[56] References Cited

U.S. PATENT DOCUMENTS

5,374,990  12/1994  Hahn et al. .................. 356/350

Primary Examiner—Samuel A. Turner
Attorney, Agent, or Firm—Lewis B. Sternfels; James F. Kirk; Keith M. Wilson

[57] ABSTRACT

Based upon the equation, $BIAS_G \alpha$ $(I_{DE}-I_{COIL}) \cdot (V_{DE}-V_{OFF})$, where $BIAS_G$ is the bias of a multi-oscillator ring-laser gyroscope (14) as induced by gain medium dispersion effects, $I_{DE}$ is the proper operating coil current, $I_{COIL}$ is the actual coil current, $V_{DE}$ is the proper path length control operating voltage and $V_{OFF}$ is the actual offset voltage. $V_{DE}$ is matched by path length control offset voltage and/or $I_{DE}$ is matched by proper coil current, to produce a zero induced $BIAS_G$. Matching, through dispersion equalization (DE), is effected by use of clockwise (C) and anticlockwise (A) (or counterclockwise) beams traversing paths with a frame (12). The beams are directed to photodetectors (52, 54) and power meters (56, 58).

16 Claims, 8 Drawing Sheets

$I_{COIL} = I_{DE}$

Fig.2b.

$I_{COIL} > I_{DE}$

Fig.2c.

$I_{COIL} < I_{DE}$

MEANS AND METHOD FOR ACTIVE DISPERSION EQUALIZATION OF A MULTIOSCILLATOR RING LASER GYROSCOPE

BACKGROUND OF THE INVENTION

1. Field of the Invention

The present invention relates to multioscillator ring laser gyroscopes and, more particularly, to a method and apparatus for effectively making such gyroscopes insensitive to external magnetic fields in all environments, dynamic and otherwise, by active dispersion equalization methods and means.

2. Description of Related Art and Other Considerations

As background discussion relating to dispersion effects, upon which the present invention is based, reference is directed to "Laser Electronics," Prentice hall, 1981, by Joseph T. Verdeyen, Chapter 9, Section 9.6, pages 241–245. Multioscillator gyroscopes require dispersion equalization.

Presently, laboratory values are measured by a "four point" method or test and modeled over ranges of temperature. The four point method is the standard dispersion equalization algorithm, and consists of measuring gyroscope bias at four different dispersion current and offset voltage combinations. Extrapolating from these measurements, the optimal settings are determined. Usually the procedure is done twice. The first results are considered a course setting which is symmetrically bracketed by the next group of four current and offset combinations.

Specifically, in the four point method, two mid-range current values are chosen for dispersion current. For each current, setting two offset voltages are selected again in the mid-range of possible values. At the first current $I_1$ and offset voltage $V_1$, gyroscope bias is measured. This assumes that the gyroscope is experiencing no unknown rotation inputs and is usually carried out on an isolated test fixture. Data are collected for about a minute to acquire reasonably accurate gyroscope bias information at that dispersion setting. Bias can be expressed in degrees per hour or in Hertz as the difference in HET frequencies. Next, the offset voltage is changed to the second value $V_2$ and another gyroscope bias is recorded as before. The dispersion current is then changed to its second setting, $I_2$, while leaving the offset voltage at $V_2$. Again bias data are recorded. Finally, without changing the current, the offset voltage is returned to $V_1$ and the last gyroscope bias reading is taken. The results of this exercise can be tabulated as follows:

| | | |
|---|---|---|
| $I_1$ | $V_1$ | $Bias_1$ |
| $I_1$ | $V_2$ | $Bias_2$ |
| $I_2$ | $V_2$ | $Bias_3$ |
| $I_2$ | $V_1$ | $Bias_4$ |

These results are used to calculate the sensitivity of bias to dispersion currents and offset voltages. The objective is to arrive at a condition of zero sensitivity for both. This is done by differencing the bias values and dividing that difference by the change in offset or current that it took to produce the bias change. For example, the sensitivity to dispersion current is determined doing the following calculations:

$$S_{I1}(V)=[(Bias_1-Bias_2)/(V_1-V_2)]Hz/V$$

and $$S_{I2}(V)=[(Bias_3-Bias_4)/(V_1-V_2)]Hz/V$$

The results above correspond to sensitivities at two dispersion currents. It is assumed that the sensitivity is a linear function of current; therefore, if these points are connected graphically by a straight line, this straight line will intercept the axis representing current which is the value of zero sensitivity. The current at that point is the desired dispersion current which is given by the following calculation:

$$I_{DE}=[-S_{I1}(I_1-I_2)/(S_{I1}-S_{I2})+I_1] \text{ amps}$$

Similarly, a set of sensitivity calculations is performed for offset voltage and, by the same method as described above, the dispersion equalization operating point is determined. In this case the sensitivity functions are as follows:

$$S_{V1}(I)=[(Bias_1-Bias_4)/(I_1-I_2)]Hz/A$$

and $$S_{V2}(I)=[(Bias_2-Bias_3)/(I_1-I_2)]Hz/A$$

Calculating the offset voltage intercept for zero sensitivity to dispersion current establishes the optimal dispersion equalization voltage which is given by the following calculation:

$$V_{DE}=[-S_{V1}(V_1-V_2)/(S_{V1}-S_{V2})+V_1] \text{ amps}$$

This procedure is repeated at several temperatures to establish a model for all operating conditions of the gyroscope, assuming that no external magnetic fields penetrate its shielding.

This four point method makes the gyroscope insensitive to external magnetic fields, if performed correctly and if external fields essentially do not change when the instrument is in actual operation, such as in flight or other dynamic environment. Unfortunately, fields can and do change, and new equalizations cannot be effected by the four point method, in particular, under such dynamic environments in which a system employing the gyroscope normally operates. Also, magnets and other instrument components will age. Over time, the dispersion values may drift, requiring an ongoing series of calibrations to correct the model. As a consequence, the gyroscopic readings can be deleteriously affected.

SUMMARY OF THE INVENTION

These and other problems are successfully addressed and overcome by the present invention by using observable discriminants for counteracting any magnetic disturbance to the gain medium. If the dispersion equalization current and path length control (PLC) voltage can be actively tuned, external field influences are eliminated. Dispersion induced gyroscope bias is described by the following equation:

$$BIAS_G \alpha \ (I_{DE}-I_{COIL})\cdot(V_{DE}-V_{OFF}),$$

where $I_{DE}$ is the desired dispersion current in the coil, $I_{COIL}$ is the current which actually exists in the dispersion field coil, $V_{DE}$ is the correct path length control (PLC) operating point, and $V_{OFF}$ is the actual offset voltage. If either of the two differences is zero, then the dispersion induced bias in the gyroscope will vanish. When $(I_{DE}-I_{COIL})$ is made equal to zero, clockwise and anticlockwise (counterclockwise) single beam intensities become equal to one another. Also, $(V_{DE}-V_{OFF})$ may be made equal to zero, which is accomplished by dithering the cavity length and observing changes in amplitude of left circularly polarized (LCP) and right circularly polarized (RCP) intensities. When the changes are of equal amplitude and opposite polarity, the desired voltage operating point is established. Although gyroscope desensitization to magnetic fields is accomplished by driving either difference to zero, any variance from zero of the current and voltage differences can be minimized by making both as small as possible which, therefore, is preferable in practice.

Several advantages are derived from the above. Primarily, external field influences are eliminated from interfering with the proper operation of the gyroscope, in particular, in dynamic environments. e.g., gimballed platforms.

Other aims and advantages, as well as a more complete understanding of the present invention, will appear from the following explanation of exemplary embodiments and the accompanying drawings thereof.

BRIEF DESCRIPTION OF THE DRAWINGS

FIG. 4 is a block diagram of a direct current (DC) dispersion equalization current servo useable in the present invention, with FIGS. 4a and 4b illustrating alternative approaches for deriving sources of offset voltages for the servo by directly measuring florescence or inferring fluorescence intensity;

DETAILED DESCRIPTION OF THE PREFERRED EMBODIMENTS

Figure 1:
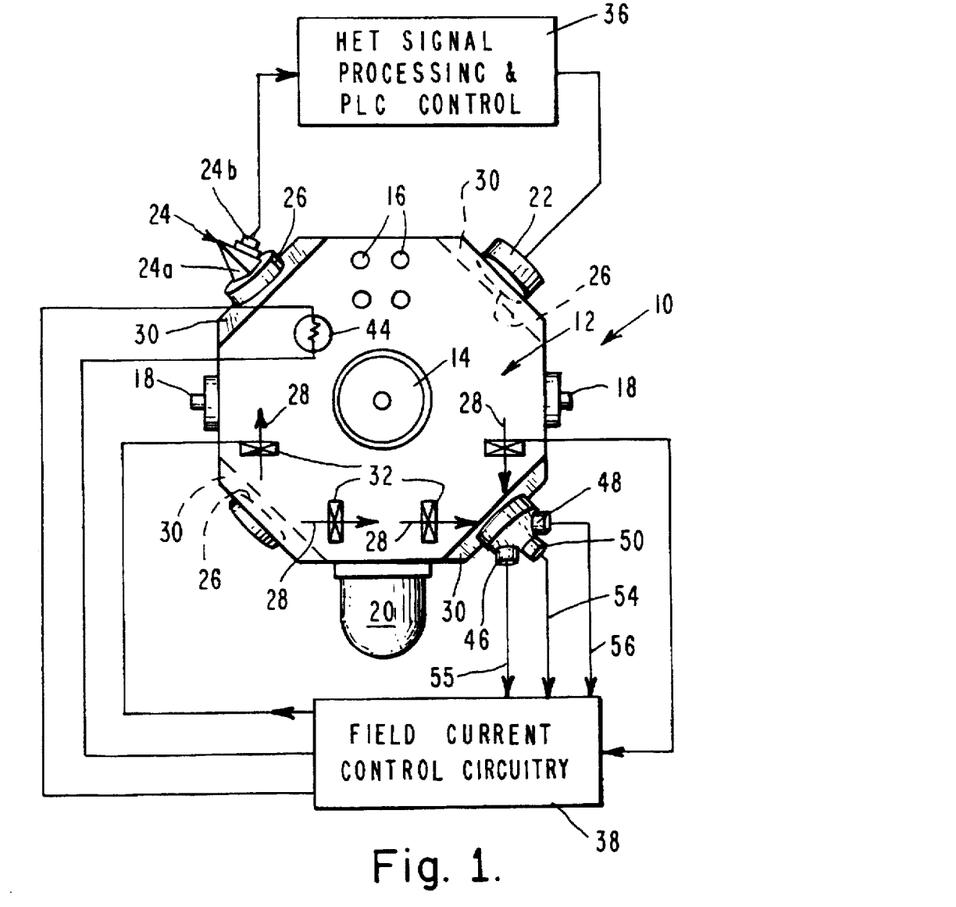
FIG. 1 is a view of the present invention comprising a multioscillator gyroscope with associated dispersion control electronics interfaces.
Figure 1A:
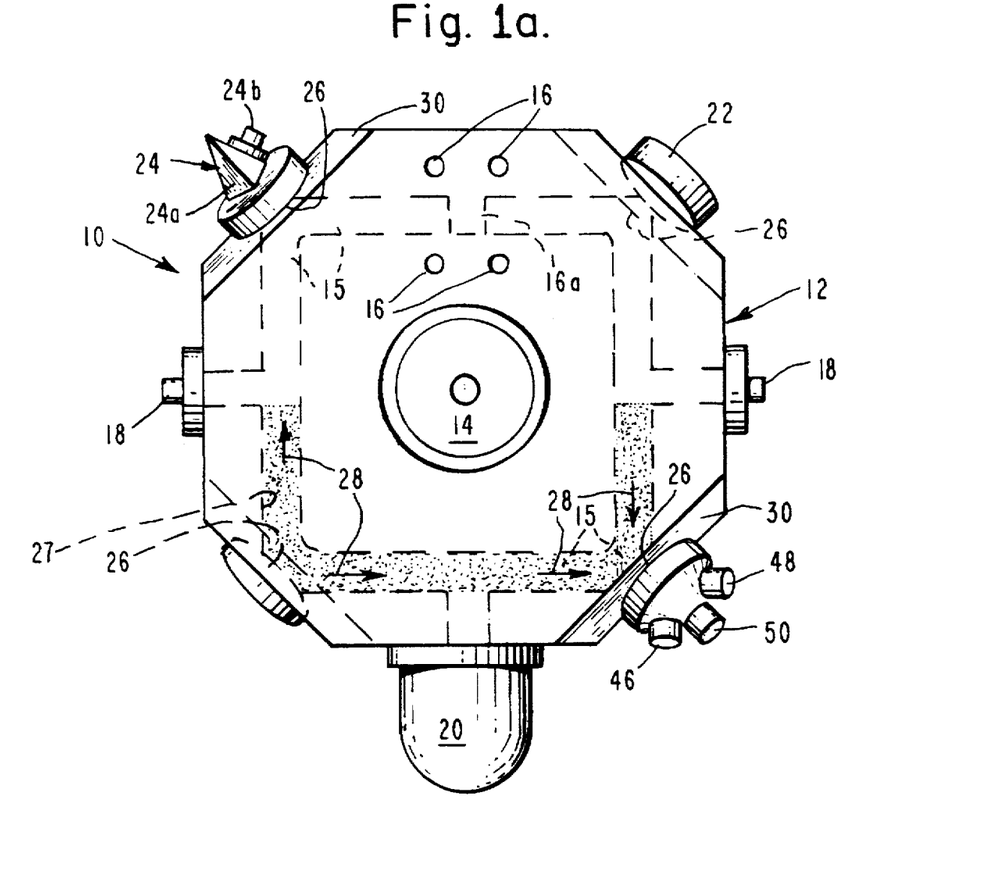
FIG. 1a is a view of an internal portion of the gyroscope depicted in FIG. 1, to show its optical path.
Figure 1B:
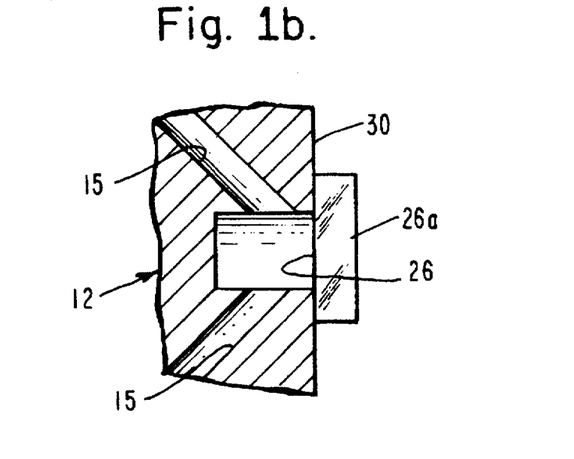
FIG. 1b is a cross-sectional side view of a portion of the optical path shown in FIG. 1a, and including a multilayer dielectric first surface mirror.

Accordingly, FIGS. 1, 1a and 1b illustrate a ring laser gyroscope assembly 10, which is sometimes referred to herein by the acronym "RLG" or "ZLG™" ("ZLG™" being a trademark adopted by Litton Systems, Inc. for its version of assembly 10, as a "zero lock gyro"). As shown in FIGS. 1 and 1a, gyroscope assembly 10 includes a frame 12 which is mounted on a supporting center post 14, and which houses an optical path 15. The frame supports Faraday rotator magnets 16, a Faraday rotator element 16a, anodes 18, a cathode 20, a path length control (PLC) transducer or piezoelectric (PZT) element 22, a heterodyne prism photodetector assembly (HET P.D. ASSY) 24, preferably a minimum of four first surface mirrors 26, and gain bores 27 which contain the plasma discharge and which are shown in FIG. 1a by stippling. Assembly 24 includes a prism 24a and a photodetector 24b attached thereto. Mirrors 26 typically are composed of multilayer dielectric materials which are deposited on a substrate 26a (see FIG. 1b) in a thickness of several microns by conventional chemical or electrodeposition techniques, such as by sputtering. Gain bores 27 are only in that part of optical cavity 15 which lies in the lower portion of gyroscope assembly 10, as viewed in FIG. 1a. Electrical discharge takes place between cathode 20 and anodes 18. Typically, frame 12 includes a plurality of angled sides 30 to which path length control transducer 22, heterodyne assembly 24 and mirrors 26 are positioned and affixed. The mirrors are not in the same plane but are located at the vertices of a tetrahedron. Gain bores 27 in frame 12 follow the same out of plane path along which the laser light travels. This path along which the laser light travels, as best seen in FIGS. 1a and 1b, constitutes optical cavity 15 of gyroscope assembly 10, and includes mirrors 26, gain bores 27 and Faraday rotator element 16a, which is centered within the laser beam and magnets 16.

Heterodyne (HET) and path length control (PLC) processing electronics 36 are coupled to heterodyne assembly 24. Electronics 36 provides signal processing for outputs derived from HET photodetector 24a and drive voltage to PLC transducer 22.

The construction depicted in FIGS. 1, 1a and 1b permits multi-oscillator ring-laser gyroscope 10 to generate laser beams which are guided within and through optical path 15 in frame 12 in clockwise (C) and anticlockwise (A) directions. Both beams are directed out of the frame as radiation to clockwise and anticlockwise photodetectors 46 and 48. A fluorescent photodetector 50 is also positioned adjacent photodetectors 46 and 48, and their respective electric signals are transmitted by lines 52, 54 and 56 to field current control circuitry 38. Coils 32 are connected in series and positioned about gain bores 27, and the fields induced by coils 32 are represented as arrows 28 directed along the gain bores. A temperature sensor 44 (FIG. 1) is thermally coupled to frame 12 and electrically coupled to field current control circuitry 38.

In operation, reference is made to the equation, $BIAS_G \alpha (I_{DE} - I_{COIL}) \cdot (V_{DE} - V_{OFF})$ , describing dispersed induced gyroscope bias, where $I_{DE}$ is the desired dispersion current in the coil, $I_{COIL}$ is the current which actually exists in the dispersion field coil, $V_{DE}$ is the correct path length control (PLC) operating point, and $V_{OFF}$ is the actual offset voltage.

Figure 2A:
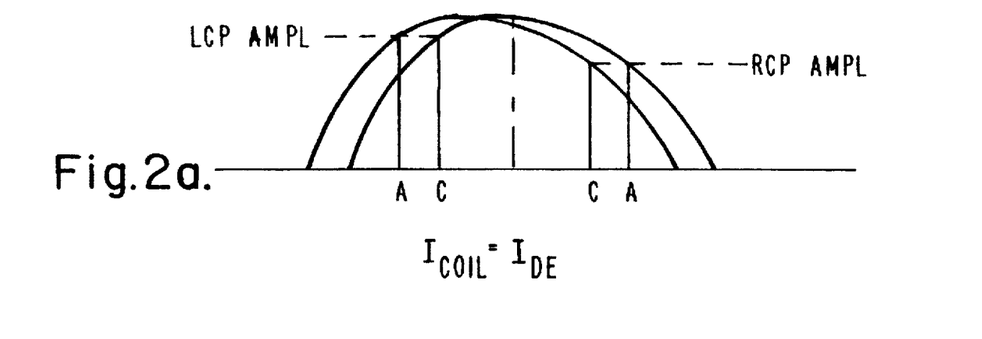
FIGS. 2a, 2b and 2c are curves illustrating the effect of dispersion field current on anticlockwise (counterclockwise) and clockwise intensity in which $I_{de}$ is the desired dispersion current in the coil and $I_{coil}$ is the current which actually exists in the dispersion field coil and in which the anticlockwise intensity is equal to (FIG. 2a), greater than (FIG. 2b) and less than (FIG. 2c) the clockwise intensity.
Figure 2B:
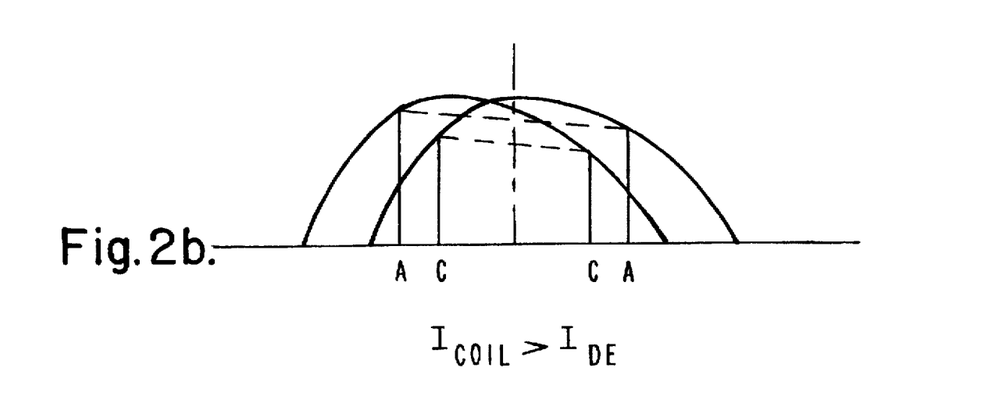
Figure 2C:
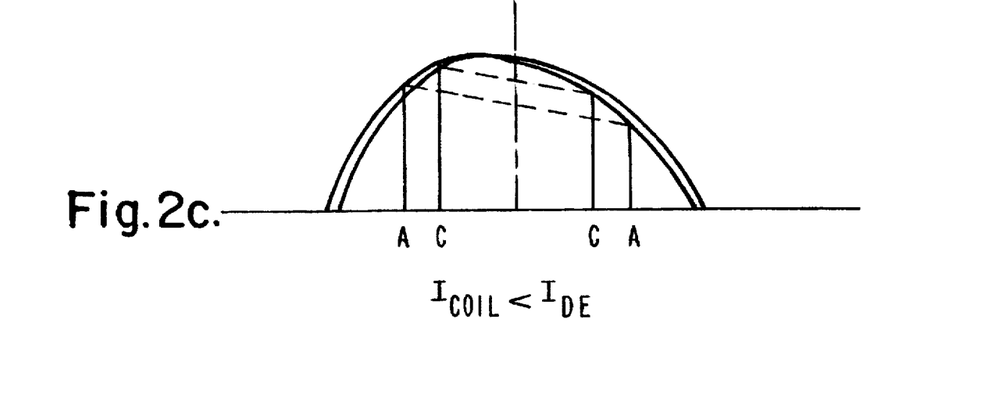

First, a method for determining the optimum dispersion current $I_{DE}$ will be discussed. In the above bias equation, the optimum dispersion current is obtained when the quantity $(I_{DE} - I_{COIL})$ is zero. The diagrams shown in FIG. 2 depict a simplified and greatly exaggerated relationship between lasing modes and the Doppler broadened gain curve in the multioscillator laser gyro. Zeeman effect causes magnetic sensitivity in the gyroscope and is responsible for the presence of two gain curves instead of one as shown FIG. 2.

Oppositely directed LCP (left circular polarized) and RCP (right circular polarized) lasing modes couple to a particular curve and do not draw energy from the other one.

LCP and RCP pairs are extracted from the gyroscope by optical and electronic means to provide the rotation readout signals for the instrument. The heterodyned LCP and RCP line pairs are referred to as HET signals. The separation of LCP and RCP pairs is dictated by the optical cavity geometry. Faraday bias combined with Sagnac effect determine the separation between the lines constituting each LCP and RCP pair. In an actual gyroscope this difference is about 1 MHz (Faraday splitting±Sagnac effect). The LCP and RCP pairs may be separated by about 750 MHz depending on the cavity geometry. Fortunately, gain saturation effects in the laser medium cause a ten fold amplification of the intensity differential in clockwise (C) and anticlockwise (A) beam intensities over what one would expect based solely on the relative frequency separations. The fact that such a difference in intensities exists when dispersion equalization is other than optimal makes this a usable discriminant.

In FIG. 2a the field current operating point has been correctly set. Summed anticlockwise intensities, $A_{lcp}$ and $A_{rcp}$, are equal to the combined clockwise intensities, $C_{lcp}$ and $C_{rcp}$. For this condition, virtually any translation of the LCP and RCP lasing modes along the gain curve (voltage offset) results in intensities of combined C and A components remaining equal to each other. This is to be expected from the bias equation. If excessive current is applied to the coil surrounding the gyroscope plasma, the situation will change to that shown in FIG. 2b. Gain curves are pulled farther away from one another and now the combined anticlockwise intensity is greater than that of the clockwise beams. FIG. 2c shows what happens for insufficient coil current. For both of these cases, the gyroscope will exhibit a change in bias except at one particular offset voltage. This results from frequency pulling of the various lasing modes due to their relative positions along the gain curves.

By adjusting the dispersion equalization field current to maintain equal intensities for A and C beams, the sensitivity due to non-optimal PLC voltage is eliminated from the bias equation.

When the A and C intensities are subtracted, a non-zero value can result even though the proper dispersion current is applied. This is due to unequal amounts of fluorescence impinging on the photodetectors measuring A and C components of laser light. Fluorescence measuring photodetector 50, which is shown in FIGS. 1 and 1a, provides a means of counteracting any differential in fluorescence light seen by the photodetectors. Temperature sensor 44 is also shown in FIG. 1 as an alternative to direct fluorescence measurement.

Figure 3:
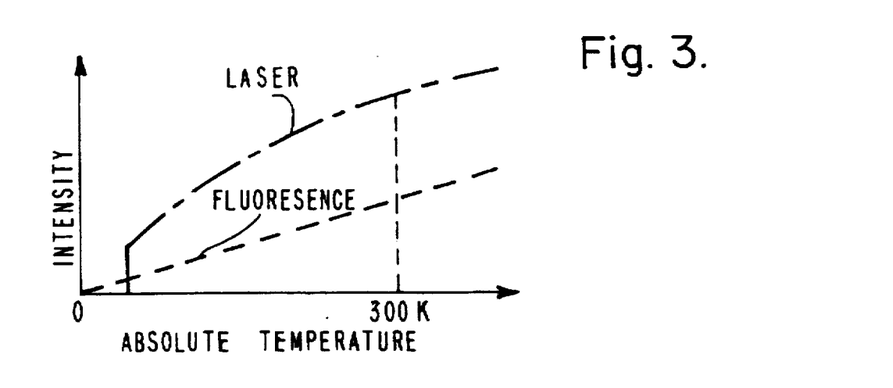
FIG. 3 is a curve showing fluorescence and laser intensities as a function of absolute temperature.

Offset values contributed by fluorescence are very linear with temperature and have a value of zero at absolute zero. FIG. 3 shows the relationship of laser and fluorescence light to temperature. While laser output is nonlinear and subject to aging of laser mirrors and other optical cavity components, the fluorescence is quite linear and shows very little change with time. By knowing the zero intercept for fluorescence and a correction value at some temperature, the offset at any other temperature can be easily computed. For example, if the offset is found to be 1.00 volt at 300° K. (27° C.), then it will be 10% higher at 330° K. (57° C.) or 1.10 volts.

While a more direct method for managing the fluorescence problem would be to install an optical filter in front of each A and C photodetector, the use of such filters is expensive and, therefore, the prior discussed method is more economical.

Figures 4, 4A:
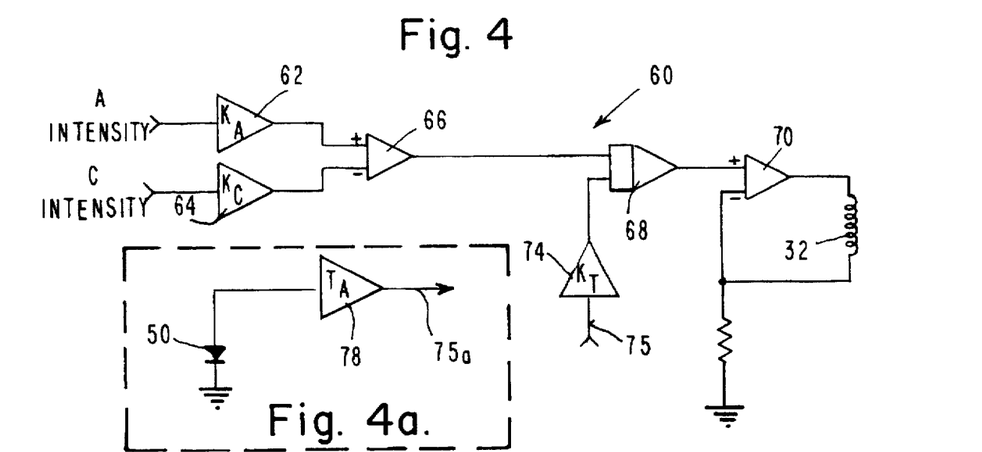
Figure 4B:
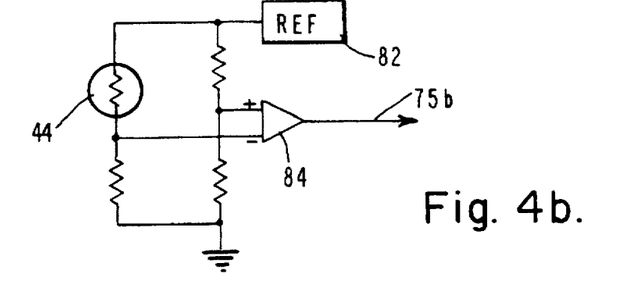

FIGS. 4, 4a and 4b illustrate a block diagram of a dispersion equalization current servo 60 based on differential A and C laser intensity. As illustrated in FIG. 4, a pair of gain scaling amplifiers 62 and 64, respectively designated $K_A$ and $K_C$, provide the inputs to a differential amplifier 66. The values of $K_A$ and $K_C$ are subject to modelling for the purpose of compensating temperature driven mismatches in electronic components. Not shown, but included in circuitry conventional to servo 60, are A and C photodetectors with their associated transimpedance amplifiers.

An integrator 68 is coupled at its input to differential amplifier 66 and at its output to a current amplifier 70. An amplifier 74, designated $K_T$, is also electrically connected to integrator 68. Differential amplifier 66 operates such that its output is the servo error signal which is, in turn, an input to integrator 68. The integrator output controls the dispersion current using a suitable voltage to current amplifier 70 which supplies gyroscope dispersion equalization coil 32.

Integrator 68 also receives an offset voltage from amplifier 74. This offset is shown as being derived from one of two alternative sources as received through an input 75 to amplifier 74. The choice of source depends on tradeoffs between the approaches for deriving the offset voltage source.

In the first approach for deriving the offset voltage source as shown in FIG. 4a, fluorescence is measured directly by photodetector 50 with its associated transimpedance amplifier 78 whose output 75a is supplied to amplifier 74 through its input 75. This photodetector may be part of the gyroscope assembly as shown in FIGS. 1 and 1a or located somewhere near the gyroscope so that it can be illuminated by the plasma discharge from the gyro. The advantage of this approach is that fluorescence is compensated for by direct measurement. A disadvantage is in further the cost for the additional photodetector and amplifier.

In the second approach for deriving the offset voltage source as shown in FIG. 4b, temperature is used to infer fluorescence intensity. This approach employs temperature sensor 44, which is generally incorporated into a bridge circuit including a voltage reference 82 and a differential amplifier 84 whose output 75b is supplied to amplifier 74 through its input 75. Because the gyroscope is always fitted with one or more such sensors, it is the primary advantage of this florescence compensating method that no further circuitry need be added. The disadvantage, however, is that temperature sensing elements generally have non-linearity and their response is delayed. To circumvent this disadvantage, a temperature model may be introduced into amplifier 74 ($K_T$) but this complication is usually undesirable.

In a practical mechanization, integrator 68 would be implemented in software. It would also be advantageous to perform the differencing in software. Scale factors are established by performing a standard four point dispersion equalization (preferably at several temperatures) after which any non-zero difference in A and C intensity becomes part of a compensation algorithm.

It is to be understood that, although servo 60 involves temperature modelling, such modelling is conducted only to compensate for non-linearities in the electronics which actively servo the dispersion current to its optimum value. In the traditional dispersion control method, temperature models passively compensate for both electronics and instrument dispersion requirements which are valid only so long as the magnetic environment is not changing for reasons unrelated to temperature. For example, magnetic shielding may not be completely effective or the Faraday bias magnets may weaken with age.

Figure 5A:
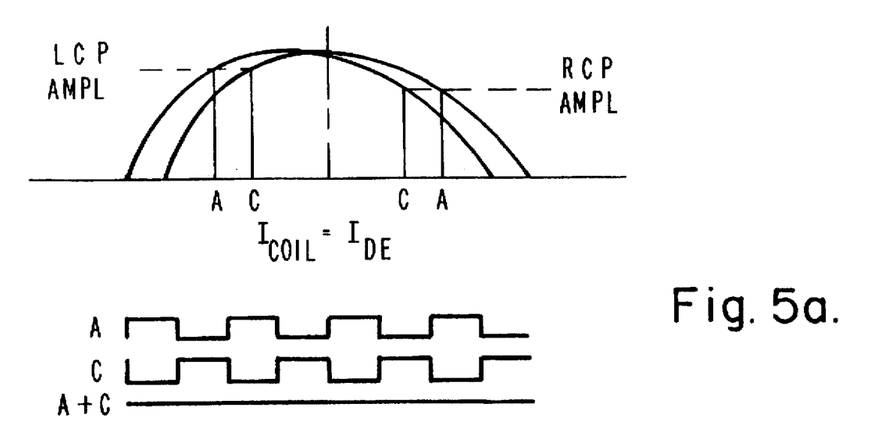
FIGS. 5a, 5b and 5c are curves representing the effect of dispersion field current on anticlockwise (A) and clockwise (C) amplitudes when the field current has a time varying component superimposed upon it, and in which the anticlockwise amplitude is equal to (FIG. 5a), greater than (FIG. 5b) and less than (FIG. 5c) the clockwise amplitude.
Figure 5B:
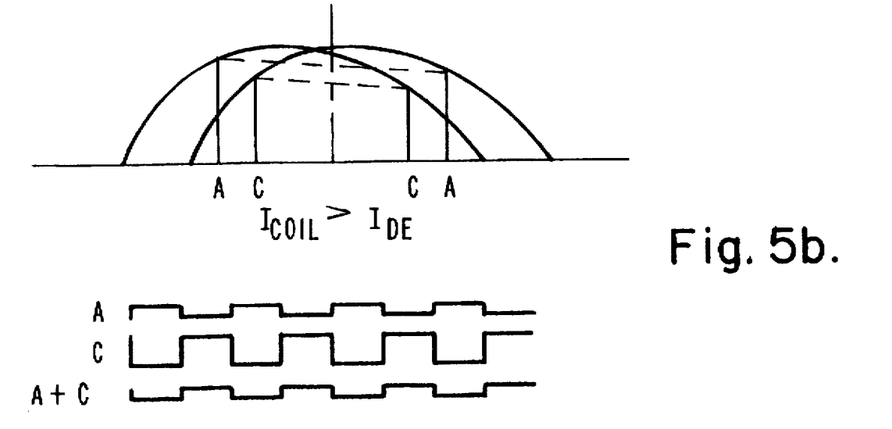
Figure 5C:
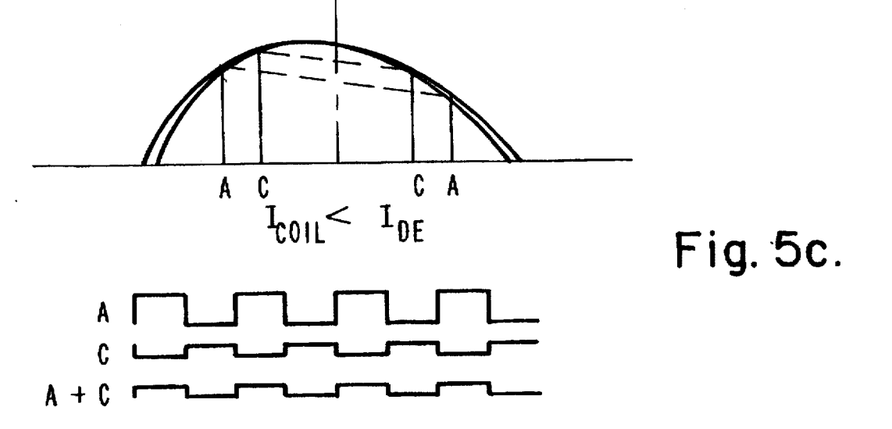

An AC servo, such as a hill climbing servo, is also usable and the results of dithering dispersion equalization (DE) current about its operating point is shown in FIG. 5a. No modulation is present on the combined intensities in this case. If operated at other than optimum current, one pair of A or C lines is always on a shallower gain curve slope as shown in FIGS. 5b and 5c. This results in less modulation for the most intense pair as field current is dithered. The observed modulation phase relative to dithered field current is used to servo average DE current.

Figure 6:
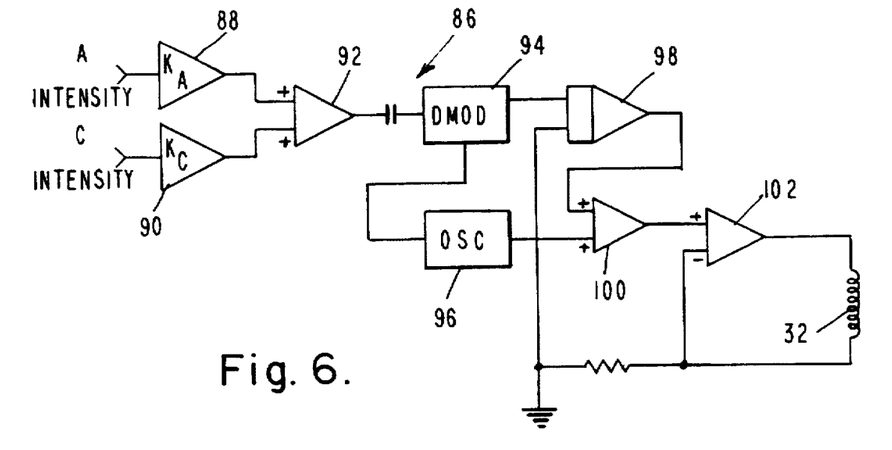
FIG. 6 is a block diagram of an alternating current (AC) dispersion current servo useable in the present invention.

FIG. 6 shows an AC servo 86, specifically a hill climbing servo, which is inherently immune to fluorescence. The hill climbing servo operates on the combined A and C intensity modulation. Intensities A and C are fed into and scaled by amplifiers 88 and 90, respectively designated $K_A$ and $K_C$. Amplifiers 88 and 90 are coupled to a summing amplifier 92 to combine their outputs, and amplifier 92 and its output is AC coupled to the remaining servo components. These components include a demodulator switch 94, a reference oscillator 96, an integrator 98, a summing amplifier 100 and a voltage to current amplifier 102. As shown, oscillator 96 and integrator 98 are connected in parallel between switch 94 and summing amplifier 100. Current amplifier 102 is connected to summing amplifier 100 and to gyroscope dispersion equalization coil 32 to drive the coil. The demodulation of intensity variations can be implemented in software.

Using an AC dispersion current servo involves some trade offs and may not be suitable for some applications. In order to take advantage of such a servo, the magnetic environment which is being compensated for must be changing much slower than the modulation introduced by the servo and cannot have frequency components which are multiples of the modulation frequency. If this is not the case, interactions occur which could produce errors in the dispersion current setting. Also, when the current is being dithered, it spends little time at the optimum value, hence the instrument is subject to errors in PLC offset voltage. This means that dithering of the PLC voltage is to be avoided while the dispersion current servo is active. This requirement is not considered a problem because sequential operation of these two loops is preferred, but it does imply that PLC offset voltage be known with more precision than may be necessary if a DC current servo is employed. Finally, some cases having a rapidly changing current in the dispersion coil may cause coupling of the dither signal into other electronics enclosed with the gyroscope and this, in turn, may put additional packaging restrictions on the instrument.

While the servo is active, little time is spent at an optimum current; therefore, the gyroscope is not completely immune to errors in offset voltage during this interval. This is especially relevant if a dithered path length control servo is employed. Also, the AC current excursions required to obtain a usable discriminant tend to be large.

Regarding servos relying on summed intensities for magnetic field dispersion equalization, there is a fairly stringent requirement for gain matching in A and C channels if a true null-seeking servo is to be realized. There are a number of methods for reducing matching requirements. The preferred technique involves performing an accurate dispersion equalization by the previously discussed four point method. Once accomplished, the field current is commanded to a value far away from the DE (dispersion equalization) optimum, for example, 25% of its maximum. Measurements of A and C intensities are made for this current setting. The coil current is next commanded to an equally large DC excursion in the opposite direction from optimum and intensity measurements are again recorded. If the intensity changes are not identical, then $K_a$ or $K_c$ is adjusted to make them equal.

When dealing with a DC servo, the procedure is complicated by fluorescence light. In this case, after channel gain adjustments are made, the loop is allowed to seek and operating point. If the coil current does not return to its DE optimum, then integrator offset gain $K_t$ (see FIG. 4) is adjusted to force it to that value. Next, the coil current is sent on DC excursions as described in the immediately preceding paragraph, and intensity measurements recorded. Adjustments for $K_a$ or $K_c$ are again made to obtain a zero intensity difference. The whole procedure is repeated several times until optimum $K_a$, $K_c$ and $K_t$ values are found. These become calibration constants for a model when the procedure is conducted at several temperatures.

Figure 7A:
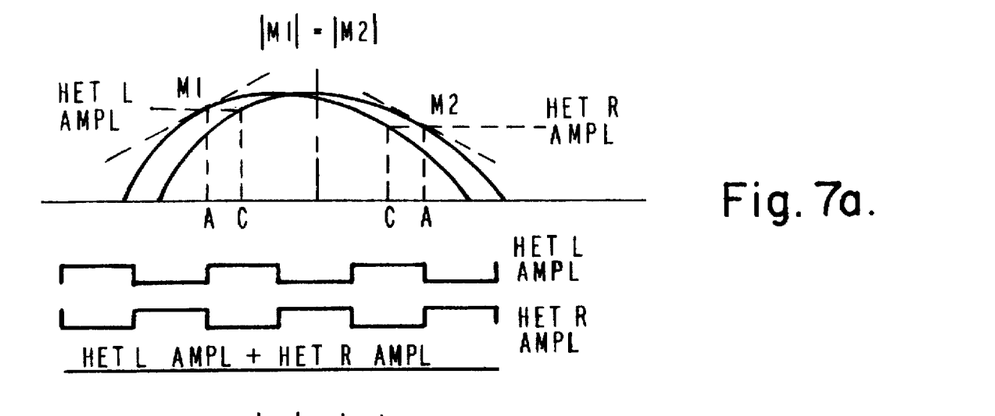
FIGS. 7a, 7b and 7c are curves which show the effect of path length control (PLC) offset on heterodyne (HET) modulation amplitudes in which the absolute values of the slopes |M1| and |M2| are respectively equal to one another (FIG. 7a), |M1| is greater than |M2| (FIG. 7b) and |M1| is less than |M2| (FIG. 7c)
Figure 7B:
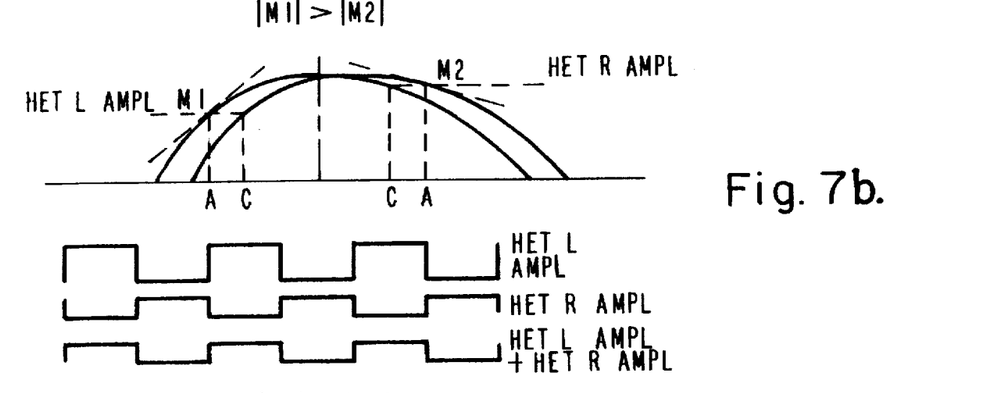
Figure 7C:
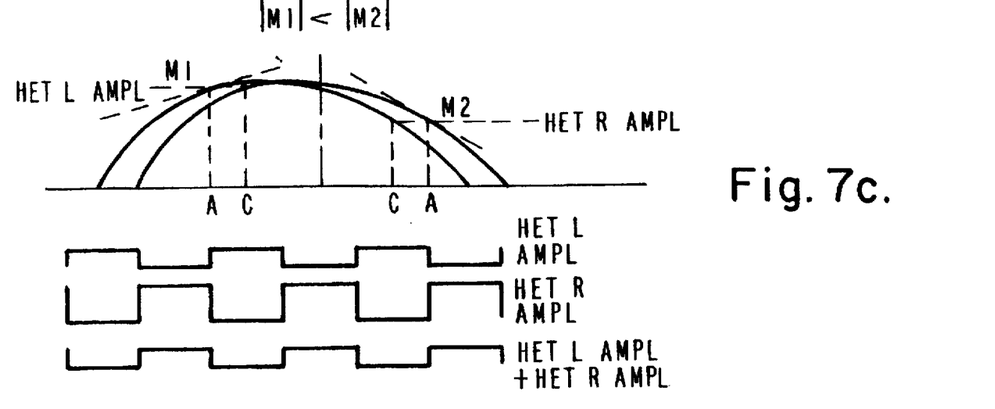

The offset voltage component of the dispersion equalization (DE) bias equation $BIAS_G\alpha$ $(I_{DE}-I_{COIL})\cdot(V_{DE}-V_{OFF})$ is considered next. The objective here is to make $(V_{DE}-V_{OFF})$ equal, to zero, where $V_{DE}$ is the desired operating point and $V_{OFF}$ is the actual PLC drive voltage. Path length control is achieved to first order by driving the piezoelectric mirror transducer so that LCP and RCP line pairs are equal in amplitude (see FIG. 7). Optical and electronic means are employed to isolate these line pairs which are rotation readout signals for the multioscillator ring laser gyro. They are also referred to in FIG. 7 as HET L (left circular polarized) and HET R (right circular polarized) lines.

If the gain curves were perfectly gaussian in shape, servoing HET signals to equal amplitudes would be sufficient for achieving immunity to magnetic field disturbances. In reality, the gain curves are asymmetrical due largely to gas mixtures used for the gain medium. Asymmetry results in the necessity for operating the PLC servo at an offset from equal HET amplitudes.

FIG. 7 shows what is being accomplished with path length control. The optimum set point occurs when LCP and RCP line pairs operate on equal but opposite gain curve slopes as shown in FIG. 7a. When the absolute values of the slopes (M1 and M2) match, there is minimum sensitivity to magnetic field induced bias cancels. If path length is dithered, intensity variations on these line pairs are of equal amplitude but inverted in phase. A summation of their amplitudes produces no change in the combined intensity. For this discussion, slope changes are assumed to be small over the dither excursion.

Operation at other than equal and opposite slopes results in a dither signal appearing on the summed intensities with phase relationships as shown in FIGS. 7b and 7c. A servo would use phase as a discriminant to drive the PLC operating point so that modulation disappears. When the modulation vanishes, the second term $(V_{DE}-V_{OFF})$ in the DE bias equation has been reduced to zero.

Figure 8A:
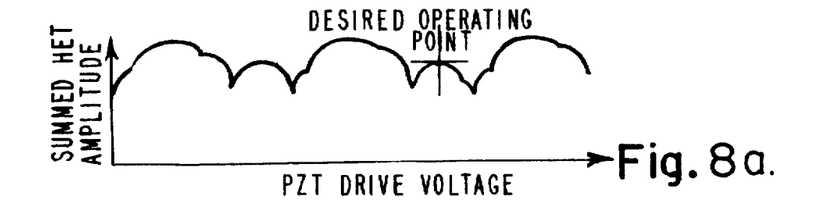
FIGS. 8a, 8b and 8c are curves which show the wave forms associated with PLC servoing respectively comparing summed HET amplitude, demodulated amplitude and HET amplitude difference versus PZT (PLC transducer) drive voltage.
Figure 8B:
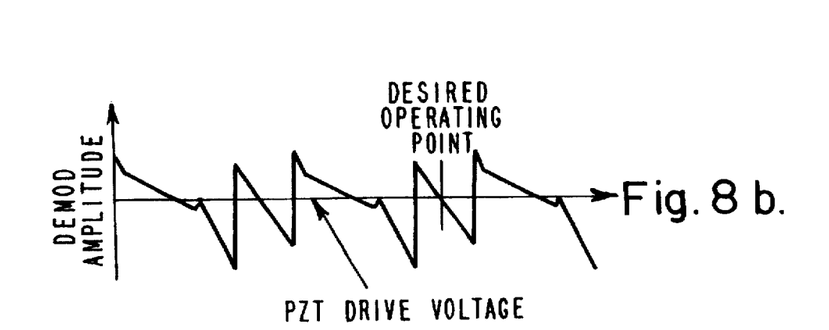
Figure 8C:
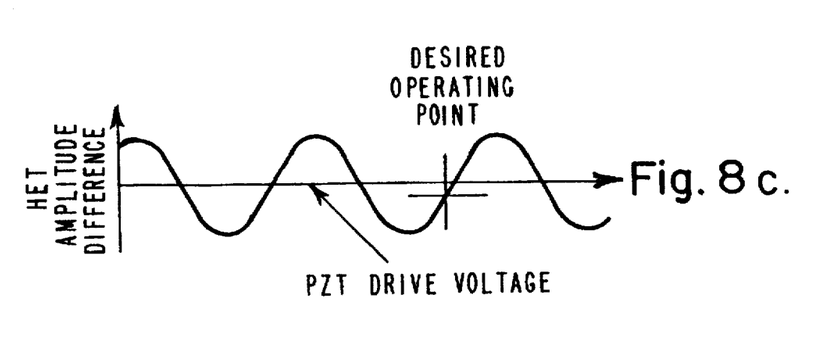

The behavior of HET amplitude portrayed in FIG. 7 would seem to dictate that a hill climbing servo similar to one shown in FIG. 6 should be used. However, summed HET amplitudes do not exhibit an uncluttered profile when the PLC drive voltage is exercised over its full range. Such a profile is shown in FIG. 8a. The variation seen for the summed HET signals is due in part to adjacent mode line pairs achieving laser threshold before the other line pairs fall below threshold. The complexity and overall shape of the intensity curve is also dictated by optical cavity size and other aspects of the laser geometry. FIG. 8b shows how the desired operating point would appear at a synchronous demodulator output of a hill climbing servo. This operating point is not readily distinguishable from other locations which could also capture the servo. However, if the HET amplitudes are subtracted, a very good discriminant is available for localizing which segment of the demodulated summed amplitudes contains the desired operating point. This is shown in FIG. 8c. A practical DE offset servo uses both the sum and difference of HET amplitudes.

Figure 9:
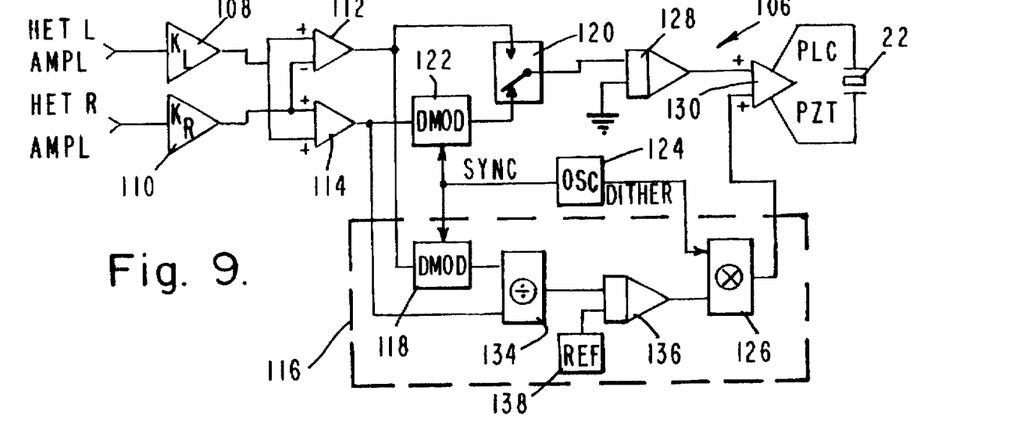
FIG. 9 is a block diagram of a PLC offset voltage dispersion equalization (DE) servo useable in the present invention.

Referring now to FIG. 9, a functional block diagram illustrates how the offset voltage DE servo operates. Modulation control functions will be ignored for the moment. The DE servo comprises a hill climbing servo 106 similar to servo 60 shown in FIG. 4 used for the AC embodiment of dispersion current control.

Servo 106 includes a pair of gain scaling amplifiers 108 and 110, respectively designated $K_L$ and $K_R$, and receive HET L and HET R signals. Both gain scaling amplifiers 108 and 110 are coupled to a differential amplifier 112 and a summing amplifier 114. Amplifiers 112 and 114 are coupled at their outputs to a modulation control 116 having a demodulator switch 118 and other components therein, as will be presently described. Differential amplifier 112 is also connected to a switch 120 and demodulator 118 in modulation control 116. Switch 120 can be toggled between "acquire" and "equalize" modes and is normally set in its equalization mode.

Summing amplifier 114 is further coupled to a demodulator 122, whose output is connected to the equalization mode side of switch 120, and to an oscillator 124. As shown, the signals from oscillator 124 are directed to both demodulators 118 and 122, and to a multiplier 126 in modulation control 116.

Switch 120 is electrically connected to an integrator 128 which, along with multiplier 126, is coupled to a PLC transducer drive amplifier 130. Amplifier 130 is connected to a piezoelectric element 22, also identified as path length (PLC) transducer 22.

Modulation control 116 is completed by a synchronous demodulator 134 which is coupled at its inputs to demodulator 118 and summing amplifier 114 and at its output to an integrator 136. Integrator 136 is connected to multiplier 126, and is provided with a voltage reference 138.

In operation, HET L and HET R amplitudes are scaled by adjusting gains $K_L$ and $K_R$ in amplifiers 108 and 110 using a procedure described below. These signals are combined in two ways, by summing amplifier 114 and by differential amplifier 112. The differential amplifier produces an error signal which is suitable for course acquisition of the desired operating point. During acquisition, switch 120 shunts the differential amplifier output to integrator 128 which in turn produces an input for PLC transducer drive amplifier 130.

Once acquisition has been achieved, switch 120 is toggled to route the output from a switch in demodulator 122 whose input comes from summing amplifier 114. Demodulator 112 comprises a switch which alternatively produces at its output a copy of the input waveform or an inverted version thereof. This output undergoes a certain amount of low pass filtering as part of this demodulation process. The signal produced by demodulator 122 now becomes an input to integrator 128. Oscillator 124 provides synchronization for demodulator 122 and a dither waveform which is eventually summed with the integrator output in PLC transducer drive amplifier 130.

These elements function together to drive any modulation present on the summed HET amplitudes to zero which is the desired voltage for dispersion equalization.

In order to obtain optimum operation of this servo, the dither waveform (before reaching its destination in PLC drive amplifier 130) is required to undergo a normalization process in the circuitry of modulation control 116.

This normalization process involves the use of demodulator switch 118 whose input comes from differential amplifier 112. Synchronization is provided by oscillator 114, and the demodulator output is divided by summing the output of summing amplifier 114. This ratio of dither amplitude on the output of differential amplifier 112 to the summed HET amplitudes is compared to a reference value from reference 138, in integrator 136. The output of integrator 138 is multiplied by the oscillator dither waveform and ultimately arrives at PLC drive amplifier 130.

The dither signal is assumed to be injected into PLC drive amplifier 130. Course acquisition of the proper mode is accomplished using the HET amplitude difference signal as a discriminant. After that has been done, the integrator input is switched to synchronous demodulator 134 operating on the summed HET signal. The output of integrator 136 then drives any modulation on the summed HET to zero.

Modulation control behaves like an automatic gain adjustment for the dither signal. This function is provided to address several performance issues related to dithering the PLC mirror. The amplitude can be too large or too small, depending on the efficiency of piezoelectric transducer 22, especially as temperature changes. Intensity may degrade as the gyroscope ages and that should also be considered. If excessive dither is present, very little time will be spent in the vicinity of the desired operating point and that can contribute to bias in the presence of time varying magnetic fields. Extremely large amplitude swings can disrupt HET counting circuitry and cause loss of data. Too little dither results in slow loop response and a poorly defined operating point. Modulation control section 116 of FIG. 9 solves these problems, by maintaining dither amplitude at a fixed percentage of the laser gyroscope intensity.

The overall operation of the above described circuitry can be summarized as follows. When the HET amplitudes are subtracted from each other in differential amplifier 112, dither induced modulation is observed to remain fairly constant over a wide range of PLC drive voltages. This signal is detected by synchronous demodulator 134 and compared to the HET signal summed in amplifier 114. The summed HET signal contains a relatively small amount of modulation over the same PLC drive range and, at the DE operating point, it vanishes. A ratio of dither to HET amplitude is obtained by dividing the output from demodulator 134 by the summed HET voltage from amplifier 114. That ratio is then compared to a reference value (from reference 138) and any difference is integrated in integrator 136. Multiplier 126 receives as inputs both the integrator output and the dither reference signal from oscillator 124. This multiplier is the gain control element which ultimately servos modulation amplitude to a constant fraction of laser intensity. Changes in laser intensity and piezoelectric transducer efficiency are both accommodated with this scheme.

Gain curve asymmetry may not be the only cause of operating point offsets. LCP and RCP lasing modes can experience unequal loss as they propagate through the optical cavity. The effect of such loss is known as differential polarization loss (DPL). The field current servos previously discussed are immune to DPL because this loss behaves as a common mode phenomenon which cancels in both AC and DC servos. However, for the PLC offset servo just described, DPL can be an error source.

DPL effects can be eliminated by adjusting the LCP and RCP channel gains (Kl and Kr respectively in FIG. 9). This is effected by tuning the optical cavity so that only one HET signal is present and its amplitude is noted. The laser is retuned, and the amplitude for the other HET signal is measured. If a difference in amplitudes is observed, one of the gains (Kl or Kr) is adjusted so that the amplitudes appear to be equal. The procedure is repeated at several temperatures to obtain a model for canceling DPL.

Figure 10:
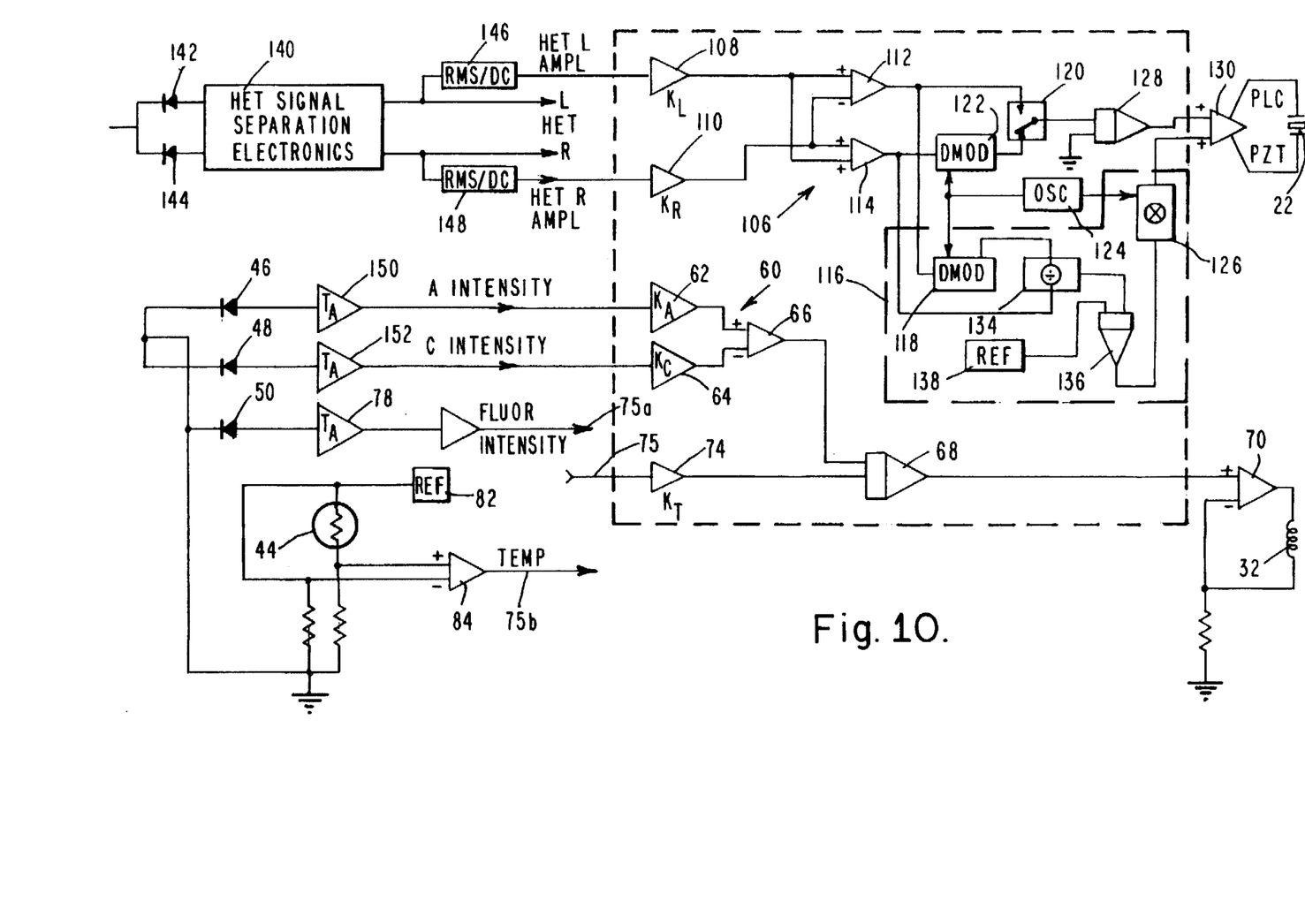
FIG. 10 is a block diagram of both active dispersion current and offset control loops and their gyroscope associated interface circuitry useable in the present invention.

Reference is now made to FIG. 10 to show how both servos interface with the various gyroscope transducers and signal processing electronics. It comprises all elements of dispersion current and voltage servos 60 and 106 of FIGS. 4 and 9 previously described, together with photodetectors and functional blocks related to gyroscope HET signal processing. Signal separation electronics 140 is coupled to servo 106 and operates on the outputs from HET photodetectors 142 and 144 to produce individual beatnote signals produced by LCP and RCP lasing line pairs as depicted in FIGS. 2, 5 and 7. The LCP and RCP pairs are isolated to produce HET L and HET R signals, respectively. They provide rotation readout data for ring laser gyroscope assembly 10 as well as path length control discriminants. It is the amplitude information contained in these signals which is important for the purpose of this description and it is obtained from RMS to DC converters or any other suitable amplitude detection means.

Photodetectors 46, 48 and 50 and associated transimpedance amplifiers 150, 152 and 78, HET signal separation electronics 140, dispersion coil 32, piezoelectric mirror transducer 22 and temperature sensor 44 are contained inside the gyroscope housing. HET amplitude detectors 146 and 148 (shown as RMS to DC converters), temperature sensor interface electronics 82 and 84 and drive amplifiers 70 and 130 are usually external to the instrument. HET amplitudes, intensities and temperature sensor signals are quantized and sent to the computer controlling the gyroscope which performs the functions associated with active dispersion control. Kl, Kr, Ka and Kc are modified by a temperature driven model to compensate for various errors.

If both dispersion control servos 60 and 66 are simultaneously active, care must be exercised in choosing dither frequencies which are not likely to interact with periodic magnetic fields. The preferred approach is to operate the servos sequentially. For some applications, active dispersion control may allow elimination of costly magnetic shielding normally required for multioscillator ring laser gyroscopes.

Although the invention has been described with respect to a particular embodiment thereof, it should be realized that various changes and modifications may be made therein without departing from the spirit and scope of the invention.

What is claimed is:

1. A method for active dispersion equalization of a multioscillator ring laser gyroscope having a plurality of coils, a path length control and means for producing single beam laser radiation traversing clockwise and anticlockwise paths, comprising the steps of:

describing gyroscope bias ($BIAS_G$) as induced by gain medium dispersion effects by the equation $$BIAS_G \alpha\ (I_{DE} - I_{COIL}) \cdot (V_{DE} - V_{OFF})$$

where $I_{DE}$ is the proper operating coil current, $I_{COIL}$ is the actual coil current, $V_{DE}$ is the proper path length control operating voltage and $V_{OFF}$ is the actual offset voltage;

obtaining optimum path length offset ($V_{OFF}$) from heterodyne amplitude as a discriminant for driving ($V_{DE} - V_{OFF}$) to zero;

obtaining optimum dispersion coil current ($I_{COIL}$) from single beam DC intensities from clockwise and anticlockwise beams as a discriminant for driving ($I_{DE} - I_{COIL}$) to zero; and matching at least one of $V_{DE}$ by path length control offset voltage and $I_{DE}$ by proper coil current, to produce a zero induced bias.

2. A method according to claim 1 in which said monitoring step comprises the step of utilizing DC photodetectors to monitor DC intensities.

3. A method according to claim 1 in which said optimum coil current ($I_{COIL}$) obtaining step comprises the steps of measuring and subtracting anticlockwise and clockwise beam intensities to obtain any resulting non-zero value mismatches therebetween, comparing any such mismatches with fluorescence intensity attendant in the gyroscope to produce an error signal, and integrating and applying the error signal to obtain coil current for equalizing the anticlockwise and the clockwise single beam laser intensities.

4. A method according to claim 3 further including the step of sensing the fluorescence intensity by a photodetector.

5. A method according to claim 3 in which said integrating and comparing steps include the step of obtaining the fluorescence intensity inferred from temperature sensor measurements.

6. A method according to claim 1 in which said optimum coil current ($I_{COIL}$) obtaining step comprises the steps of utilizing an AC hill climbing servo by measuring and summing anticlockwise and clockwise beam intensities to obtain a summed signal therefrom, demodulating the summed signal referenced to an oscillating signal to provide an error signal, integrating the error signal, summing the integrated error signal with the oscillating signal, and applying the resultant signal as dithered coil current to equalize the anticlockwise and the clockwise single beam laser intensities.

7. A method according to claim 1 in which said optimum path length offset voltage ($V_{OFF}$) obtaining step comprises the sequential steps of utilizing combined anticlockwise and clockwise intensities to provide readout signals, measuring the amplitude of the readout signals, differencing the amplitude to obtain an approximate operating point, summing the readout signal amplitudes, and optimizing the operating point by use of an AC hill climbing servo.

8. A multioscillator ring laser gyroscope and apparatus for active dispersion equalization of the gyroscope, in which bias ($BIAS_G$) in the gyroscope is described as induced by gain medium dispersion effects by the equation $$BIAS_G \alpha\ (I_{DE} - I_{COIL}) \cdot (V_{DE} - V_{OFF})$$

where $I_{DE}$ is the proper operating coil current, $I_{COIL}$ is the actual coil current, $V_{DE}$ is the proper path length control operating voltage and $V_{OFF}$ is the actual offset voltage, comprising:

a plurality of coils;

means for producing single beam laser radiation traversing clockwise and anticlockwise paths;

a path length control transducer;

means for obtaining optimum path length offset ($V_{OFF}$) from heterodyne amplitude as a discriminant for driving ($V_{DE} - V_{OFF}$) to zero;

means for obtaining optimum dispersion coil current ($I_{COIL}$) from single beam DC intensities from clockwise and anticlockwise beams as a discriminant for driving ($I_{DE} - I_{COIL}$) to zero; and means for matching at least one of $V_{DE}$ by path length control offset voltage and $I_{DE}$ by proper coil current, to produce a zero induced bias.

9. A gyroscope according to claim 8 wherein said matching means comprises means for equalizing clockwise and anticlockwise single beam intensities to permit differences in the expression ($I_{DE}-I_{COIL}$) to equal zero.

10. A gyroscope according to claim 8 further including means for producing single beam laser radiation traversing clockwise and anticlockwise paths, wherein said matching means comprises means for monitoring the intensities of the clockwise and anticlockwise beams and forcing any differences between them to zero.

11. A gyroscope according to claim 10 in which said monitoring means includes photodetectors.

12. Apparatus according to claim 8 in which said optimum coil current ($I_{COIL}$) means includes amplifiers for measuring and subtracting anticlockwise and clockwise beam intensities to obtain any resulting non-zero value mismatches therebetween, an integrator for integrating and comparing any such mismatches with a fluorescence intensity to obtain an integrated signal, and an amplifier for applying the integrated signal as coil current to equalize the anticlockwise and the clockwise single beam laser intensities.

13. Apparatus according to claim 12 in which said integrator includes means for interfacing with circuitry to measure the fluorescence intensity component of the laser beams.

14. Apparatus according to claim 12 in which said integrator includes means for interfacing with temperature measurement circuitry to obtain the fluorescence intensity component of the laser beams.

15. Apparatus according to claim 8 in which said optimum path length offset voltage ($V_{OFF}$) obtaining means comprises means for utilizing combined anticlockwise and clockwise intensities to provide readout signals, means for measuring the amplitude of the readout signals, means for differencing the amplitude to obtain an approximate operating point, means for summing the readout signals, and an AC hill climbing servo for optimizing the operating point.

16. Apparatus for active dispersion equalization of a multioscillator ring laser gyroscope based upon the equation $$BIAS_G \propto (I_{DE}-I_{COIL})\cdot(V_{DE}-V_{OFF}),$$

where $BIAS_G$ is the gyroscope bias as induced by gain medium dispersion effects, $I_{DE}$ is the proper operating coil current, $I_{COIL}$ is the actual coil current, $V_{DE}$ is the proper path length control operating voltage and $V_{OFF}$ is the actual offset voltage, comprising:

- a frame of low expansion coefficient glass having a plurality of sides sloped with respect to one another and distributed about exterior faces of said frame;
- means associated with said frame for generating and directing laser beams in said frame;
- an optical resonant cavity in said frame in which counter propagating laser beams circulating therein constitute a means for detecting rotational motion;
- a plurality of coils mounted in said frame for inducing magnetic fields;
- a path length control assembly mounted on at least one of said faces for controlling the path length of the optical cavity;
- a heterodyne photodetector and prism assembly mounted on another of said faces;
- heterodyne amplitude measuring and path length control electronics coupled to said heterodyne assembly;
- path length offset control electronics coupled to said path length control assembly and said heterodyne amplitude measuring and path length control electronics for measuring $V_{DE}$ by path length control offset control voltage to produce a zero induced bias;
- a pair of photodetectors for measuring single beam intensities;
- magnetic field control electronics coupled to said single beam intensity measuring photodetectors; and
- a mirror assembly for directing clockwise and anticlockwise laser beams from said frame to said pair of photodetectors for matching of $I_{DE}$ by proper coil current, to produce a zero induced bias.

* * * * *